United States Patent [19]
Okun

[11] Patent Number: 6,158,937
[45] Date of Patent: Dec. 12, 2000

[54] FASTENER FOR MULTIPLE LAYERS HAVING ALIGNABLE APERTURES THERETHROUGH

[76] Inventor: Milton R. Okun, P.O. Box 377, 291 Turnpike St., Canton, Mass. 02021

[21] Appl. No.: 09/440,745

[22] Filed: Nov. 16, 1999

[51] Int. Cl.[7] ............................. F16B 19/00; F16B 21/00
[52] U.S. Cl. ......................... 411/342; 411/508; 411/907; 411/913
[58] Field of Search .................................. 411/392, 508, 411/509, 510, 907, 908, 913, 339, 342, 345

[56] References Cited

U.S. PATENT DOCUMENTS

| | | | |
|---|---|---|---|
| 1,974,160 | 9/1934 | Peirson | 411/907 X |
| 2,368,200 | 1/1945 | Cavanagh | 411/508 X |
| 2,791,366 | 5/1957 | Geisler | 411/907 X |
| 3,485,133 | 12/1969 | Rapata | 411/508 |
| 4,818,824 | 4/1989 | Dixit et al. | 411/907 X |
| 5,061,137 | 10/1991 | Gourd | 411/392 X |

FOREIGN PATENT DOCUMENTS

| | | | |
|---|---|---|---|
| 2058990 | 4/1981 | United Kingdom | 411/392 |

*Primary Examiner*—Neill Wilson
*Attorney, Agent, or Firm*—Dario Santoro

[57] ABSTRACT

A fastener for multiple layers having alignable apertures therethrough. The fastener includes a first head, a second head, and a connector. The first head passes through the alignable apertures in the multiple layers and snugs against a first extreme outermost layer of the multiple layers. The second head opposes the first head and snugs against the other extreme outermost layer of the multiple layers. The connector connects the first head to the second head and is disposed in the alignable apertures in the multiple layers and maintains the first head snugly against the first extreme outermost layer of the multiple layers and the second head snugly against the second extreme outermost layer of the multiple layers and thereby retains the multiple layers between the first head and the second head.

16 Claims, 2 Drawing Sheets

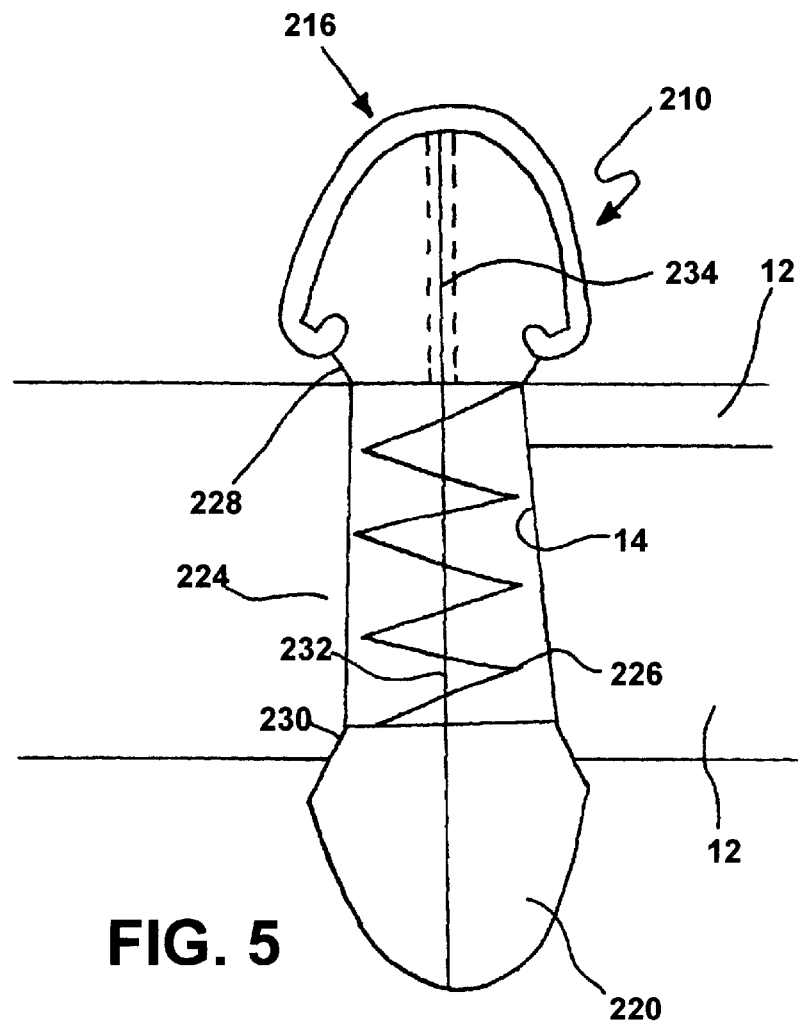
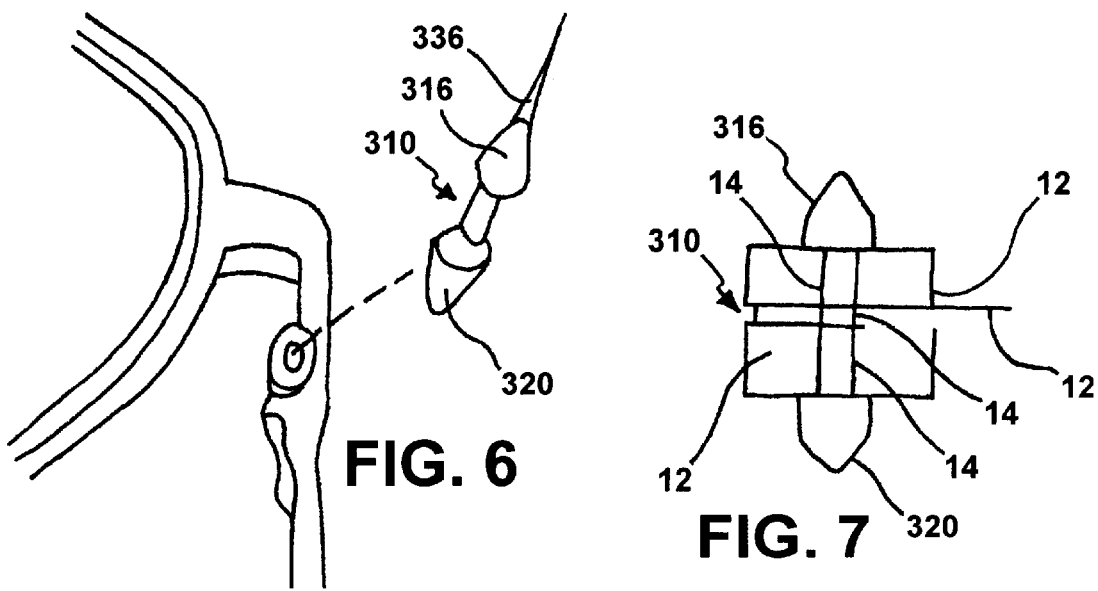

FASTENER FOR MULTIPLE LAYERS HAVING ALIGNABLE APERTURES THERETHROUGH

BACKGROUND OF THE INVENTION

1. Field of the Invention

The present invention relates to a fastener. More particularly, the present invention relates to a fastener for multiple layers having alignable apertures therethrough.

2. Description of the Prior Art

Broken or lost buttons on garments, such as shirts and blouses usually result from mechanical stress of washers and dryers, commercial pressing equipment, and normal wear. The discovery that a button has been broken or lost is often made at an inconvenient time, for example, while dressing, at work, traveling, or when the garment is unpackaged from the laundry. At such times, it may be inconvenient or impossible to repair the button using the tried and trued techniques of needle and thread or sewing machine. Even if a needle and thread or sewing machine is available, many individuals have difficulties manipulating these devices due to poor eyesight, coordination or the like, or are simply disinclined to engage in such activity.

Thus, a need exists for quickly and easily replacing lost buttons to garments, regardless of the circumstances surrounding the discovery of a lost button.

Furthermore, rivets are typically used to join two or more rigid panels. Rivets generally have a pin which is driven into a body. The body has a head, a shank and an axial bore extending through the head and the shank for receiving the pin. The body is insertable into aligned holes in the panels to be joined by the plastic rivet.

The body shank of a typical plastic rivet is provided with interior annular grooves and a plurality of elongated perforations about its walls. When the pin is driven into the axial bore of the body, the walls of the body shank bend radially outwardly trapping the panels between the body head and the body shank and preventing extraction of the body from the aligned holes of the joined panels. As the walls so bend, the pin translates through the body until a serrated portion of the pin engages the annular grooves of the shank, thereby locking the rivet assembly in a permanent fashion. The superfluous portion of the pin is broken off, either through use of a break-away indentation or a separate cutting tool.

Many prior art rivets, however, have proven unsatisfactory in that either a separate cutting process is needed to remove the superfluous portion of the pin, or, with rivets employing a break-away indentation, the pin break is not guaranteed to be flush with the body head and may require an additional cutting process to ensure that the pin does not protrude beyond the body head. A second problem with prior art rivets is that they are suitable for use only with panels having a narrow range of combined thickness. The strength and stability with which panels are held together by a rivet depends largely on the length of the body shank portion which protrudes beyond the panels. If the body shank is very short, for example, there will be an insufficient force between the body head and the outwardly bent portion of the body shank to hold the panels together tightly. Thus, prior art plastic rivets are generally rated for specific panel thicknesses, necessitating the manufacture of different sized rivets for applications having different panel thicknesses.

Thus, there is a need for a rivet that is adjustable for variations in panel thickness, thereby making the rivet suitable for use in a wider range of applications than prior art rivets.

Another problem encountered in fastening is with a screw and hinge assembly used for joining together the temple pieces of eye glass frames to the front lens holding frame often working itself free from the hinge. The loosening of the screw within the hinge is greatly facilitated by the temple pieces being constantly opened and closed against the front frame. The loosening of the screw from the hinge will cause the glasses to easily slip down over the wearer's nose and eventually can lead to the temple piece separating from the front frame of the eye glasses. In order to counteract the tendency of eye glass screws to work loose, the screw must be very precisely machined in order to fit the apertures in the hinges. This fine machining adds to the cost and possibilities of defective screw and hinge assemblies.

Thus, a need exists for an effective hinge assembly for joining together the temple pieces of eye glass frames to the front lens holding frame without the use of screws that loosen from the hinge with continued use.

Numerous innovations for fasteners devices have been also been provided in the prior art that will be described. Even though these innovations may be suitable for the specific individual purposes to which they address, however, they differ from the present invention.

For example, U.S. Pat. No. 3,678,797 to Seckerson teaches a resilient fastener comprising a head and a shank which is mountable in a workpiece formed with a circular aperture. The shank comprises a substantially flat and rigid stem, which is integral with the head and which extends lengthwise of the shank in a plane containing the longitudinal axis of the shank. Extending lengthwise of the shank on opposite sides of the stem are two resilient tongues each of which is joined to the stem along one longitudinal edge and each of which has a free longitudinal edge which is flexible towards the stem in a plane perpendicular to the plane of the stem. Preferably, an outwardly projecting rib is provided extending lengthwise along the free longitudinal edge of each tongue and each rib is shouldered adjacent the head.

Another example, U.S. Pat. No. 3,776,092 to Sseckerson teaches a resilient synthetic plastics fastener having a head and a shank extending outwardly from the undersurface of the head and comprising a longitudinal stem and two longitudinal flanges lying one on each side of the stem. The flanges are joined to the stem by resilient webs and are compressible inwardly of the shank towards the stem. Each flange has a longitudinal edge remote from the web and an outer surface which comprises a longitudinal operative face adjacent the said edge and a longitudinal inoperative face between the operative and the web. The operative face of each flange is convexly curved in section and is adapted to engage the rim of a circular aperture when the shank is inserted through the aperture and the inoperative face is adapted to clear the rim of the aperture so as to substantially reduce the area of interference between the flanges and the rim of the aperture.

Still another example, U.S. Pat. No. 4,001,923 to Frankel et al. teaches a jewelry clasp that is provided with a female member and a complementary male member adapted to cooperate with a releasable locking member disposed within the body of the female member, where the locking member engages the male member to hold the male member within the female member to prevent removal thereof. The locking member includes an integral one-piece construction having a locking portion for engaging the male member, a resilient portion for biasing the locking portion against the male member, and an actuating portion for moving the locking portion relative to the pressure of the resilient portion for releasing the male member to permit retraction of the male member from the female member. A holding member disposed within the female member positions the resilient portion relative to the female member. In a modified embodiment, the female member is provided with two integral one-piece locking members to function as a safety precaution to prevent accidental retraction of the male member from the female member.

Yet another example, U.S. Pat. No. 4,091,962 to van Buren, Jr. teaches a panel hole closure that is composed of a rigid plate having an integral array of resilient fingers projecting from one surface of the plate inboard of the plate rim. A integral stiffener is provided for each finger which stiffens the finger against inward deflection toward the axis of the plate so that once the closure is seated in a panel aperture, it is difficult to dislodge. A plastic sealing ring encircling the plate rim may be melted and flow to provide a fluid-tight seal between the closure plate and panel.

Still yet another example, U.S. Pat. No. 4,927,287 to Ohkawa et al. teaches a fastener that includes a female body and male body. By forcibly inserting the male body into a male body insertion hole of the female body, the two bodies are temporarily coupled together. By further inserting the male body into the female body from this state, leg portions of the female body are caused to flare outwardly so that overlapped plates are fastened together between the flared leg portions and a head portion of the female body. By further inserting the male body into the female body from this state, the leg portions are released from the flared state, so that the plates can be unfastened. When and only when the leg portions are inserted through a hole of a plate to be fastened by means of the fastener disposed in the temporarily coupled state, can the male body be further inserted within the female body so as to fasten the two plates to each other.

Yet still another example, U.S. Pat. No. 5,301,396 to Benoit teaches a fastener assembly for engagement with an aperture in an article including a fastener having at least a shank, a head at a first end of the shank and a resilient retaining member along the shank for releasably retaining the fastener to the article after insertion of at least a portion of the retaining member within the aperture, and an engagement member for compressing the retaining member prior to insertion within the aperture and contact of the retaining member with the article, and for preventing compression of the retaining member by the article about the aperture.

Still yet another example, U.S. Pat. No. 5,416,954 to Sobin teaches a flexible fastener that has an apex region, a first cantilevered leg and a second cantilevered leg, joined to one another at an apex region. A distributed spring action area is positioned off of the apex region, and along at least one of the cantilevered legs, and is formed by providing the apex with a relatively thick head compared with the thickness of the leg members, so that flexure is limited to the legs, and kept away from the apex region. The flexible fastener is particularly suited for use in a catch assembly for jewelry, especially a bangle. Preferably the flexible fastener is substantially planar, and flexes within its plane of construction. Although the flexible fastener can be constructed from any material which acts as a spring, preferably the fastener is constructed from heat treatable carat gold alloy spring material.

Yet still another example, U.S. Pat. No. 5,724,709 to Kittmann et al. teaches an expansion anchor to be anchored in a hole of one member to connect thereto another member that includes a head to abut a surface of the one member. A shaft extends from the head to be inserted through the hole in the one member. The shaft has extending therefrom fins that are deflectable toward the shaft upon insertion of the fins with the shaft into a hole and that are resiliently expandable away from the shaft when the fins have passed through the hole. Thus, the fins abut the opposite surface of the one member to prevent removal of the anchor from the hole. At least one stopper member is positioned relative to the shaft to cooperate with an inner edge of the hole to maintain a desired position of the shaft laterally relative to the hole. The fins have respective projections dimensioned such that, when the fins have passed through the hole, the projections extend into the hole and cooperate with the inner edge thereof to maintain the desired lateral position. The stopper member and the projections are located at different, non-overlapping positions relative to the shaft.

Still another example, U.S. Pat. No. 5,937,486 to Bockenheimer teaches a closure element that is made of plastic, particularly for sealing off at least one opening in at least one support member, in particular, in a automotive body, the closure element including a head section located above the support, and a basic body portion extending through the support. At least one region of the closure element is made of a material which expands under the influence of temperature. The basic body portion and the head section of the closure element is preferably formed of a single piece of thermal plastic material, which, is with increased thermal influence, media-tight bondable via a gluing action within the openings.

It is apparent that numerous innovations for fasteners have been provided in the prior art that are adapted to be used. Furthermore, even though these innovations may be suitable for the specific individual purposes to which they address, however, they would not be suitable for the purposes of the present invention as heretofore described.

SUMMARY OF THE INVENTION

Accordingly, an object of the present invention is to provide a fastener for multiple layers having alignable apertures therethrough that avoids the disadvantages of the prior art.

Another object of the present invention is to provide a fastener for multiple layers having alignable apertures therethrough that is simple and inexpensive to manufacture.

Still another object of the present invention is to provide a fastener for multiple layers having alignable apertures therethrough that is simple to use.

Briefly stated, yet another object of the present invention is to provide a fastener for multiple layers having alignable apertures therethrough. The fastener includes a first head, a second head, and a connector. The first head passes through the alignable apertures in the multiple layers and snugs against a first extreme outermost layer of the multiple layers. The second head opposes the first head and snugs against the other extreme outermost layer of the multiple layers. The connected connects the first head to the second head and is disposed in the alignable apertures in the multiple layers and maintains the first head snugly against the first extreme outermost layer of the multiple layers and the second head snugly against the second extreme outermost layer of the multiple layers and thereby retains the multiple layers between the first head and the second head.

The novel features which are considered characteristic of the present invention are set forth in the appended claims. The invention itself, however, both as to its construction and its method of operation, together with additional objects and advantages thereof, will be best understood from the following description of the specific embodiments when read and understood in connection with the accompanying drawing.

BRIEF DESCRIPTION OF THE DRAWING

The figures of the drawing are briefly described as follow:

FIG. 5 is a diagrammatic cross sectional view of at third embodiment of the present invention;

FIG. 6 is a diagrammatic perspective view of a fourth embodiment of the present invention in the process of fastening; and FIG. 7 is a diagrammatic cross sectional view illustrating the result of the fastening process shown in FIG. 6.

LIST OF REFERENCE NUMERALS UTILIZED IN THE DRAWING

Figure 1:
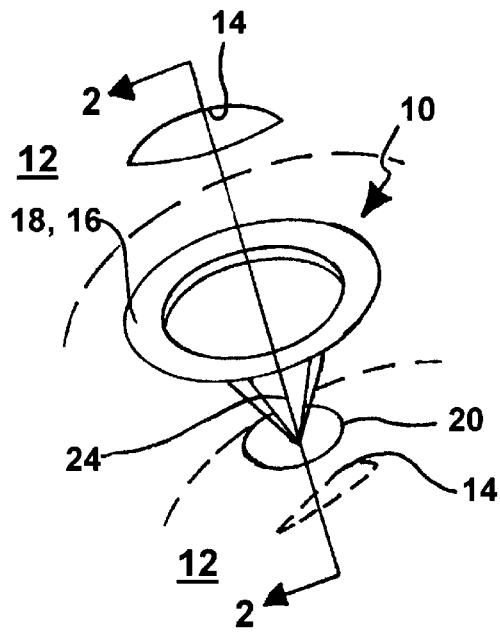
FIG. 1 is a diagrammatic perspective view of a first embodiment of the present invention in the process of fastening.

First Embodiment 10 fastener of the present invention for multiple layers 12 having alignable apertures 14 therethrough
12 multiple layers
14 alignable apertures in multiple layers 12
16 first head for passing through alignable apertures 14 in multiple layers 12 and snugging against first extreme outermost layer 18 of multiple layers 12
18 first extreme layer of multiple layers 12
20 second head for snugging against other extreme outermost layer 22 of multiple layers 12
22 other extreme outermost layer of multiple layers 12
24 connected for disposing in alignable apertures 14 in multiple layers 12 and maintaining first head 16 snugly against first extreme outermost layer 18 of multiple layers 12 and second head 20 snugly against second extreme outermost layer 22 of multiple layers 12 and thereby retaining multiple layers 12 between first head 16 and second head 20

Second Embodiment 110 fastener
124 connector
126 coil spring of connector 124 for use with alignable apertures 14 in multiple layers 12 that are not deformable.

Third Embodiment 210 fastener
216 first head for use with alignable apertures 14 in multiple layers 12 that are not deformable
220 second head for use with alignable apertures 14 in multiple layers 12 that are not deformable
226 coil spring of connector 224 for use with alignable apertures 14 in multiple layers 12 that are not deformable
228 circumferential bevel in first head 216 for facilitating removal of first head 216 through alignable apertures 14 in multiple layers 12 that are not deformable
230 circumferential bevel in second head 220 for facilitating removal of second head 220 through alignable apertures 14 in multiple layers 12 that are not deformable
232 length of flexible material of connector 224 for use with alignable apertures 14 in multiple layers 12 that are not deformable to protect against over stretching of coil spring 226 of connector 224
234 stem of connector 224 for facilitating insertion of the head 216 through alignable apertures 14 in multiple layers 12 that are not deformable

Fourth Embodiment 310 fastener
316 first head
320 second head
336 removable flap for facilitating insertion of first head 316 through alignable apertures 14 in multiple layers 12, and which is removed, after insertion

DETAILED DESCRIPTION OF THE PREFERRED EMBODIMENT

Figure 2:
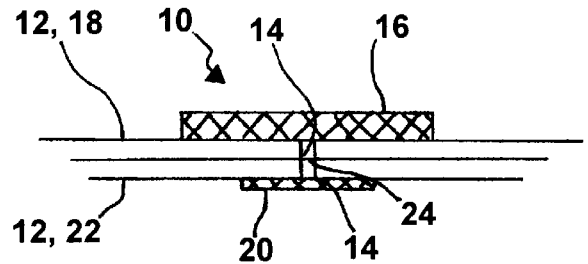
FIG. 2 is a diagrammatic cross sectional view taken on LINE 2—2 in FIG. 1 illustrating the result of the fastening process.

Referring now to the figures, in which like numerals indicate like parts, and particularly to FIGS. 1 and 2, which are, respectively, a diagrammatic perspective view of a first embodiment of the present invention in the process of fastening, and a diagrammatic cross sectional view taken on LINE 2—2 in FIG. 1 illustrating the result of the fastening process, the first embodiment of the fastener of the present invention is shown generally at 10 for multiple layers 12 having alignable apertures 14 therethrough.

The fastener 10 comprises a first head 16 for passing through the alignable apertures 14 in the multiple layers 12 and snugging against a first extreme outermost layer 18 of the multiple layers 12.

The fastener 10 further comprises a second head 2;0 opposing the first head 16 for snugging against the other extreme outermost layer 22 of the multiple layers 12.

The fastener 10 further comprises a connected 24 connecting the first head 16 to the second head 20 for disposing in the alignable apertures 14 in the multiple layers 12 and maintaining the first head 16 snugly against the first extreme outermost layer 18 of the multiple layers 12 and the second head 20 snugly against the second extreme outermost layer 22 of the multiple layers 12 and thereby retaining the multiple layers 12 between the first head 16 and the second head 20.

The first head 16 is disc-shaped for use with the alignable apertures 14 in the multiple layers 12 that are deformable.

The first head 16 is rigid for use with the alignable apertures 14 in the multiple layers 12 that are deformable.

The second head 20 is disc-shaped for use with the alignable apertures 14 in the multiple layers 12 that are deformable.

The second head 20 is rigid for use with the alignable apertures 14 in the multiple layers 12 that are deformable.

The connector 24 is slender, elongated, and elastic for use with the alignable apertures 14 in the multiple layers 12 that are deformable.

Figure 3:
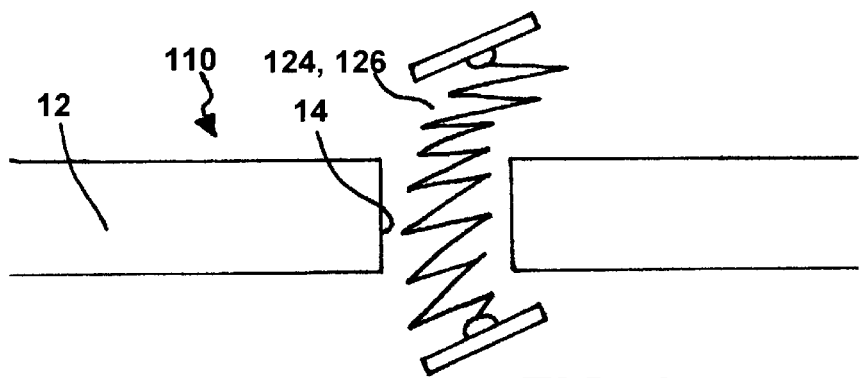
FIG. 3 is a diagrammatic cross sectional view of a second embodiment of the present invention in the process of fastening.
Figure 4:
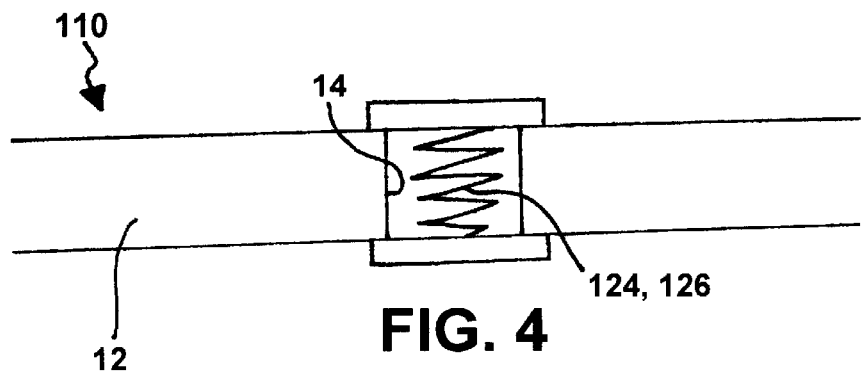
FIG. 4 is a diagrammatic cross sectional view illustrating the result of the fastening process shown in FIG. 4.

The configuration of the second embodiment of the fastener 110 can best be seen in FIGS. 3 and 4, which are, respectively, a diagrammatic cross sectional view of a second embodiment of the present invention in the process of fastening, and a diagrammatic cross sectional view illustrating the result of the fastening process shown in FIG. 4, and as such, will be discussed with reference thereto.

The fastener 110 is identical to the fastener 10, except that connector 124 is a coil spring 126 for use with the alignable apertures 14 in the multiple layers 12 that are not deformable.

The configuration of the third embodiment of the fastener 210 can best be seen in FIG. 5, which is a diagrammatic cross sectional view of a third embodiment of the present invention, and as such, will be discussed with reference thereto.

The first head 216 is bulbous-shaped for use with the alignable apertures 14 in the multiple layers 12 that are not deformable.

The second head 220 is bulbous-shaped for use with the alignable apertures 14 in the multiple layers 12 that are not deformable.

The first head 216 is compressible for facilitating insertion through the alignable apertures 14 in the multiple layers 12 that are not deformable.

The second head 220 is compressible for facilitating insertion through the alignable apertures 14 in the multiple layers 12 that are not deformable.

The first head 216 has a circumferential bevel 228 that extends therearound for facilitating removal of the first head 216 through the alignable apertures 14 in the multiple layers 12 that are not deformable.

The said second head 220 has a circumferential bevel 230 that extends therearound for facilitating removal of the second head 220 through the alignable apertures 14 in the multiple layers 12 that are not deformable.

The connector 224 comprises a coil spring 226 for use with the alignable apertures 14 in the multiple layers 12 that are not deformable.

The connector 224 further comprises a length of flexible material 232 that extends though the coil spring 226 of the connector 224 for use with the alignable apertures 14 in the multiple layers 12 that are not deformable to protect against over stretching of the coil spring 226 of the connector 224.

The connector 224 further comprises a stem 234 that passes axially through the first head 216 and rigidifies the first head 216 when the first head 216 is compressed for facilitating insertion of the first head 216 through the alignable apertures 14 in the multiple layers 12 that are not deformable.

The configuration of the fourth embodiment of the fastener 310 can best be seen in FIGS. 6 and 7, which are, respectively, a diagrammatic perspective view of a fourth embodiment of the present invention in the process of fastening, and a diagrammatic cross sectional view illustrating the result of the fastening process shown in FIG. 6, and as such, will be discussed with reference thereto.

The fastener 310 is similar to the fastener 10, except that:
1) The first head 316 is conically-shaped.
2) The second head 320 is conically-shaped.
3) The fastener 310 further includes a removable flap 336 extending axially from the first head 316 for facilitating insertion of the first head 316 through the alignable apertures 14 in the multiple layers 12, and which is removed, after insertion.

It will be understood that each of the elements described above, or two or more together, may also find a useful application in other types of constructions differing from the types described above.

While the invention has been illustrated and described as embodied in a fastener for multiple layers having alignable apertures therethrough, however, it is not limited to the details shown, since it will be understood that various omissions, modifications, substitutions and changes in the forms and details of the device illustrated and its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute characteristics of the generic or specific aspects of this invention.

The invention claimed is:

1. A fastener for multiple layers having alignable apertures therethrough, comprising:

a) a first head for passing through the alignable apertures in the multiple layers and snugging against a first extreme outermost layer of the multiple layers; said first head being disc-shaped for use with the alienable apertures in the multiple layers that are deformable; said first head being rigid for use with the alignable apertures in the multiple layers that are deformable;

b) a second head opposing said first head for snugging against the other extreme outermost layer of the multiple layers; and c) a connector connecting said first head to said second head for disposing in the alignable apertures in the multiple layers and maintaining said first head snugly against the first extreme outermost layer of the multiple layers and said second head snugly against the second extreme outermost layer of the multiple layers and thereby retaining the multiple layers between said first head and said second head.

2. The fastener as defined in claim 1, wherein said second head is disc-shaped for use with the alignable apertures in the multiple layers that are deformable.

3. The fastener as defined in claim 2, wherein said second head is rigid for use with the alignable apertures in the multiple layers that are deformable.

4. The fastener as defined in claim 3, wherein said connector is slender, elongated, and elastic for use with the alignable apertures in the multiple layers that are deformable.

5. The fastener as defined in claim 3, wherein said connector is a coil spring for use with the alignable apertures in the multiple layers that are not deformable.

6. A fastener for multiple layers having alignable apertures therethrough, comprising:

a) a first head for passing through the alignable apertures in the multiple layers and snugging against a first extreme outermost layer of the multiple layers; said first head being bulbous-shaped for use with the alignable apertures in the multiple layers that are deformable;

b) a second head opposing said first head for snugging against the other extreme outermost layer of the multiple layers; said second head being bulbous-shaped for use with the alignable apertures in the multiple layers that are deformable; and c) a connector connecting said first head to said second head for disposing in the alignable apertures in the multiple layers and maintaining said first head snugly against the first extreme outermost layer of the multiple layers and said second head snugly against the second extreme outermost layer of the multiple layers and thereby retaining the multiple layers between said first head and said second head.

7. The fastener as defined in claim 6, wherein said first head is compressible for facilitating insertion through the alignable apertures in the multiple layers that are not deformable.

8. The fastener as defined in claim 7, wherein said second head is compressible for facilitating insertion through the alignable apertures in the multiple layers that are not deformable.

9. The fastener as defined in claim 8, wherein said first head has a circumferential bevel that extends therearound for facilitating removal of said first head through the alignable apertures in the multiple layers that are not deformable.

10. The fastener as defined in claim 9, wherein said second head has a circumferential bevel that extends therearound for facilitating removal of said second head through the alignable apertures in the multiple layers that are not deformable.

11. The fastener as defined in claim 10, wherein said connector comprises a coil spring for use with the alignable apertures in the multiple layers that are not deformable.

12. The fastener as defined in claim 11, wherein said connector further comprises a length of flexible material that extends through said coil spring of said connector for use with the alignable apertures in the multiple layers that are not deformable to protect against over stretching of said coil spring of said connector.

13. The fastener as defined in claim 12, wherein said connector further comprises a stem that passes axially through said first head and rigidities said first head when said first head is compressed for facilitating insertion of said first head through the alignable apertures in the multiple layers that are not deformable.

14. A fastener for multiple layers having alignable apertures therethrough, comprising:

a) a first head for passing through the alignable apertures in the multiple layers and snugging against a first extreme outermost layer of the multiple layers; said first head being conically-shaped;

b) a second head opposing said first head for snugging against the other extreme outermost layer of the multiple layers; said second head being conically-shaped; and c) a connector connecting said first head to said second head for disposing in the alignable apertures in the multiple layers and maintaining said first head snugly against the first extreme outermost layer of the multiple layers and said second head snugly against the second extreme outermost layer of the multiple layers and thereby retaining the multiple layers between said first head and said second head.

15. The fastener as defined in claim 14, wherein said connector is slender, elongated and resilient.

16. The fastener as defined in claim 15, further comprising a removable flap extending axially from said first head for facilitating insertion of said first head through the alignable apertures in the multiple layers, and which is removed, after insertion.

* * * * *